Sept. 24, 1935.  A. N. SPÁNEL  2,015,632
METHOD OF MAKING DIPPED RUBBER ARTICLES
Filed Oct. 31, 1933  3 Sheets-Sheet 1
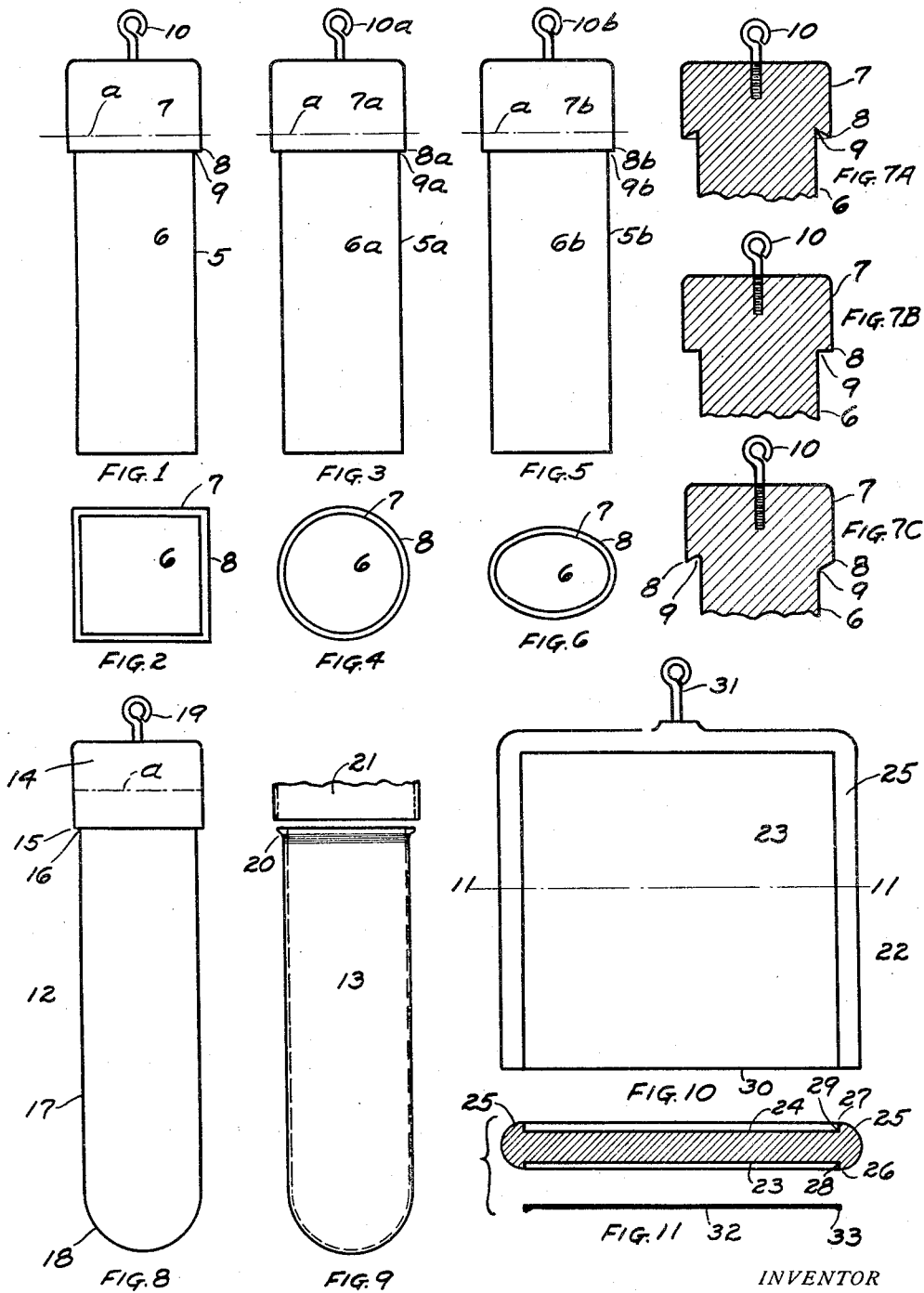
INVENTOR
ABRAHAM N. SPANEL
BY D. Clyde Jones
ATTORNEY Sept. 24, 1935.  A. N. SPÁNEL  2,015,632
METHOD OF MAKING DIPPED RUBBER ARTICLES
Filed Oct. 31, 1933  3 Sheets-Sheet 2
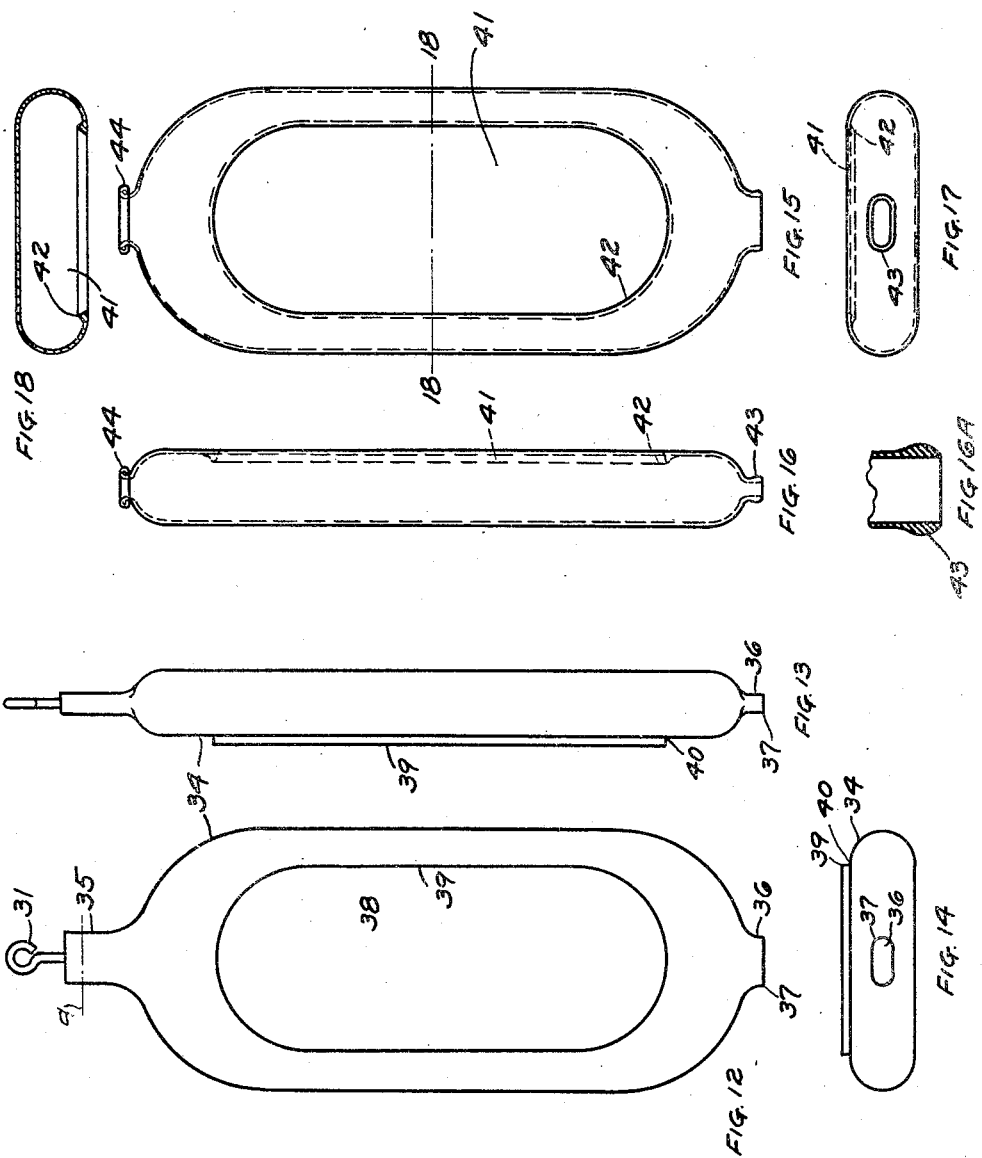
INVENTOR
ABRAHAM N. SPANEL
BY D. Clyde Jones
ATTORNEY Sept. 24, 1935.   A. N. SPÁNEL   2,015,632
METHOD OF MAKING DIPPED RUBBER ARTICLES
Filed Oct. 31, 1933   3 Sheets-Sheet 3
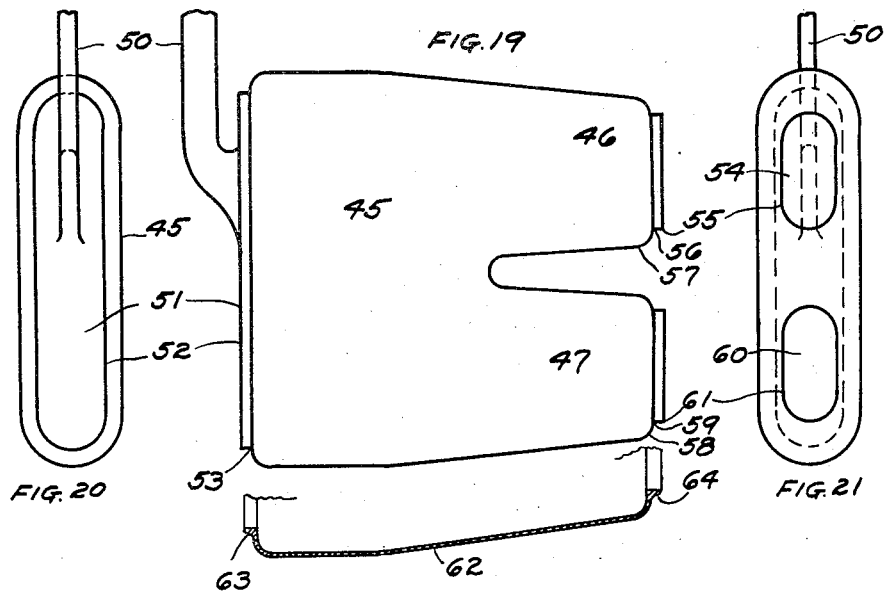
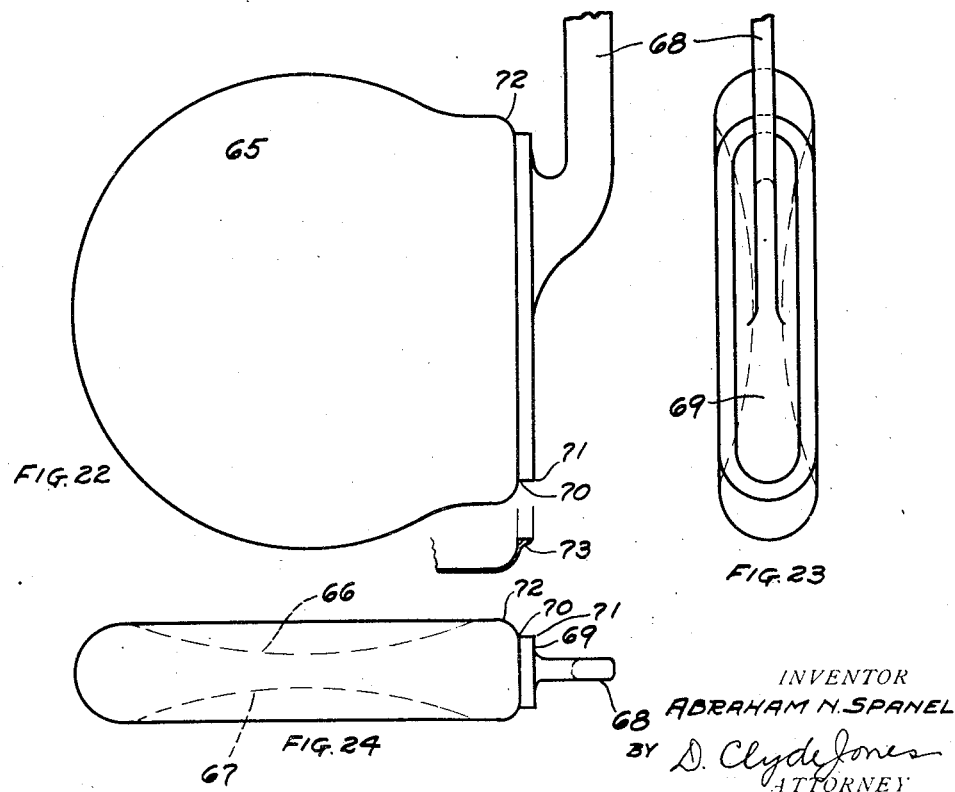
INVENTOR
ABRAHAM N. SPANEL
BY D. Clyde Jones
ATTORNEY Patented Sept. 24, 1935

2,015,632

UNITED STATES PATENT OFFICE 2,015,632

METHOD OF MAKING DIPPED RUBBER ARTICLES

Abraham N. Spánel, Rochester, N. Y.

Application October 31, 1933, Serial No. 696,037

15 Claims. (Cl. 18—58)

This invention relates to the method of and to apparatus for making dipped rubber goods of liquid latex. This application is a continuation in part of applicant's co-pending application, Serial #688,122, filed September 5, 1933.

In the manufacturing of dipped rubber articles, much difficulty has been encountered in making a desired opening or openings in the deposited layer forming the article without tearing the same, and in addition providing a reinforced edge at the margin of the opening or openings. In the past such a reinforced edge has usually been made by rolling a bead at the margin of the material, but bead-rolling is expensive, and in the case of large openings, it is difficult to roll a bead neatly.

It has been proposed to make a reinforced edge in a dipped product by providing a horizontal trough on the dipping form at the position where it is desired to deposit the reinforced edge so that the latex or aqueous dispersion of rubber can accumulate therein under the force of gravity. Such an arrangement has not proved to be satisfactory since the latex in flowing into the trough, traps a certain amount of air which forms air pockets in the edge of the deposited layer so that the resulting reinforcement instead of being smooth, is pitted, presenting an unsightly appearance.

It has also been proposed to provide an abrupt edge at the lowermost surface of the form on which the article is deposited by dipping into liquid latex, so that the abrupt edge defines an opening and the deposited latex accumulates at or adjacent the abrupt edge under the force of gravity to provide a reinforcement around the defined opening in the deposited layer. This arrangement while satisfactory has its limitations in that the form must be designed so that the edge of the desired opening in the resulting product will be in a horizontal position at the lower surface of the form during dipping. However, in the dipping of many articles, it is essential that the reinforcement for the desired opening or openings in the finished product, be deposited in a position not limited to the horizontal.

In accordance with the main feature of this invention, the phenomenon of surface tension is utilized to provide a reinforcement in any desired part of a layer of latex deposited on a form irrespective of the position of the form during the dipping operation.

A further feature of the invention resides in the method of making a reinforcement in a dipped rubber article, by accumulating a mass of rubber in the deposited layer by surface tension, adjacent a weakened portion of the layer.

An additional feature of the invention relates to a form having portions in two different planes connected together to provide a junction in which the liquid latex can accumulate by surface tension and to provide one of these portions with an abrupt edge adjacent the junction so that the liquid latex deposited on said edge will tend to flow therefrom and will thus define a weakened area in the deposited layer. In this manner a portion of the layer adjacent the mentioned junction can be removed from the remainder of the layer to form an opening therein, which opening is reinforced by the accumulation of the latex in the mentioned junction.

A further feature of the invention relates to forms on which dipped rubber articles can be deposited in any convenient dipping position and by which the excess material of the deposited layer can be separated from the remainder of the layer to form an edge therefor, which edge is reinforced by an accumulation of the material in the margin thereof.

These and other features of the invention will appear from the detailed description and claims when taken with the drawings in which Figs. 1 and 2 represent respectively a side and a bottom view of a rectangular form illustrating the principle of the invention; Figs. 3 and 4 are likewise a side view and a bottom view of a cylindrical form and Figs. 5 and 6 are similarly a side view and a bottom view of a form having an elliptical cross-section also further illustrating the invention; Figs. 7A, 7B and 7C represent longitudinal sections of different forms with suitable parting edges and adjacent junctions of different types in which a reinforcing margin may be provided in a deposited layer; Fig. 8 is a front elevation of a form on which a finger cot can be made according to the method of the present invention; and Fig. 9 is a view of a finger cot made on the form of Fig. 8; Fig. 10 is a side elevation of a form suitable for making dipped rubber sheeting; Fig. 11 is a cross sectional view of this form taken on the line 11—11 of Fig. 10 and also showing a cross-section of a piece of sheeting in slightly spaced relation with respect to the form; Figs. 12, 13 and 14 are respectively a front view, a side view and an end view of a form on which a sanitary pad shield may be deposited by the method of this invention; Figs. 15, 16 and 17 are respectively a front view, a side view and an end view of a sanitary pad shield deposited on the form shown in Figs. 12, 13 and 14, and Fig. 16A is an enlarged detail view of the lower end of the shield as illustrated in Fig. 16 while Fig. 18 is a cross-sectional view of the shield taken on the line 18—18 of Fig. 15; Fig. 19 is a front view of a form according to the present invention on which rubber pants may be deposited together with a section of the resulting dipped product adjacent thereto; while Fig. 20 is a left end view of this form and Fig. 21 is a right end view thereof, and Fig. 22 is a front view of a form on which a bathing cap can be deposited together with a section of a cap adjacent thereto, while Fig. 23 is a side view of this form and Fig. 24 is a right end view thereof.

Referring to Figs. 1 and 2, 5 designates one type of form illustrating the principle of the invention. This form is generally rectangular in shape and is provided with abrupt edges. The upper portion 7 of the form is somewhat larger than the lower portion 6 so that it provides an overhang with an abrupt edge 8. The lower portion 6 and the upper portion 7 are herein shown at right angles to each other to form a junction although the relation between these portions may vary from a right angle as will hereinafter be set forth.

During use, the form 5 while suspended by support 10, is dipped into a bath of an aqueous dispersion of rubber or the like, herein generally designated latex, as far as the dotted line "a", one or more times with a drying period between each dip. During the dipping operations the latex will tend to flow away from the abrupt corners of the form, thereby developing regions of weakness in the deposited layer. At the junction 9 between the lower portion 6 and the upper portion 7 of the form, the latex during the dipping will accumulate by surface tension until the recess or space at the junction is filled with latex. After the deposited layer is properly dried and cured, the excess layer between the dotted line "a" and the abrupt edge 8 may be stripped or torn away readily due to the weakness in the layer at the abrupt edge. The remainder of the deposited layer can then be removed from the form.

In Figs. 3 and 4 a different shape of form 5a is provided which is generally circular in cross-section. This form is likewise provided with an upper portion 7a and a lower portion 6a joined together at a junction point 9a and with an abrupt circular edge 8a. In use, this form while suspended by support 10a, is dipped one or more times into a latex bath until a layer of the proper thickness is deposited on the form. During the dipping, latex will accumulate at the junction 9a to provide a reinforcing edge for the upper edge of the layer while it will flow away from abrupt edge 8a. In this case also, the excess of the deposited layer may be stripped or torn away as far as the abrupt edge 8a.

In Figs. 5 and 6 the form 5b is generally elliptical in cross-section and is likewise provided with an upper portion 7b and a lower portion 6b joined at the junction point 9b adjacent the overhanging abrupt edge 8b of the upper portion of the form. A support 10b projecting from portion 7b suspends the form during dipping. The method of using this form will be obvious from the description already given.

In the foregoing forms it has been indicated that the junction 9, 9a and 9b between the upper and lower portions of the form is defined by two planes intersecting generally at right angles to each other as indicated in Fig. 7B, but this junction may be defined by two planes intersecting at an acute angle as shown at Fig. 7A or by two planes intersecting to define an obtuse angle as indicated at the right side of Fig. 7C, or even by a restricted and sharply curved surface defining a recess as shown at the left side of this figure.

In Fig. 8 there is shown a form generally designated 12 on which a finger cot 13 illustrated in Fig. 9, can be made. This form is provided with an upper portion 14 having a lower overhanging abrupt edge 15 which upper portion is joined at the junction 16 with the lower portion 17 of the form. The upper and the lower portions of the form are generally circular in cross-section, while the lower portion terminates in a rounded end 18. In the making of a finger cot 13, the form 12 is dipped while suspended by support 19, into a latex bath, as far as the dotted line a. This form may be dipped one or more times into the latex bath with a period of drying intervening until a layer of the desired thickness is deposited on the form. It will be understood that during the dipping operations the liquid latex will tend to flow away from the abrupt edge 15 of the form so that a weakened line is developed thereat in the deposited layer. However, at the junction 16 the latex will tend to accumulate by surface tension between the abrupt edge 15 and the adjacent vertical surface of the lower portion as indicated at 20 in Fig. 9. After the deposited layer has been properly dried on the form and cured, the excess portion 21 of the deposited layer is stripped or torn away as far as the abrupt edge 15 thereby leaving the layer on the form with a clean cut edge at its top, reinforced by the accumulation 20 in the layer. Thereafter, the cot 13 may be stripped from the form and treated in the usual manner to prepare it for sale.

The form 22 shown in Figs. 10 and 11 is particularly adapted for making dipped rubber sheeting. This form comprises a substantially rectangular rigid plate having side panels 23 and 24 bounded on three of their sides by a raised border 25. The border is provided with abrupt edges 26 and 27 adjacent each of its junctions 28 and 29 with the respective panels 23 and 24. The bottom of the form as shown in Fig. 10 is not provided with a raised border but instead terminates in abrupt edges 30 at each panel.

In making rubber sheeting the form while suspended by the support 31 is completely submerged or dipped one or more times in a rubber or latex bath with a drying interval between each dip until a layer of the desired thickness is deposited thereon. During the dipping, the latex will tend to flow away from the abrupt edges 26, 27 and 30 to define lines of weakness thereat in the deposited layer, but will tend to accumulate by surface tension at the junctions 28 and 29, and will accumulate by gravity above edge 30. After the deposited layer is properly dried, the portion thereof on border 25 is stripped or torn away as far as the lines of weakness in the layer formed at abrupt edges 26 and 27. The portion 32 of the layer on each panel can then be stripped therefrom and can be parted from the remainder of the layer at 30. The portion 32 will be a rectangular sheet having a smooth reinforced margin 33. The sheet can then be treated in accordance with the usual practice of finishing dipped latex articles to prepare it for sale.

The invention may also be utilized in forms for making sanitary pad shields as shown in the form illustrated in Figs. 12, 13 and 14. This form includes a flattened oblong body portion 34 having rounded corners and having a thickness indicated at Figs. 13 and 14. The body portion terminates in the flattened necks 35 and 36 of which the neck 36 is provided with a support 31 by which the form can be suspended from a frame (not shown). The neck 36 terminates in an abrupt lower edge 37, the purpose of which will be further set forth. One flat face of the body portion is provided with a raised panel 38 having a flattened elliptical outline corresponding to the size and shape of an opening to be made in the shield after it is deposited on the form. This panel rises abruptly from the face of the form to the abrupt edge 39 at an elevation sufficient to define a recess at the junction 40 of the panel with the body portion, whereby latex may accumulate therein by surface tension to provide a reinforcement for the shield. The junction 40 may be similar to that shown at 9 in Figs. 7A, 7B, 7C.

In making a shield on this form, the form is dipped as far as line "a" one or more times with a drying interval intervening, into a bath of latex until a layer of the proper thickness has been deposited on the form. After the layer is suitably dried, and cured, the portion of the layer on the panel 38 is stripped or torn away as far as the abrupt edge 39 to provide a lateral opening 41 in the resulting shield as shown in Fig. 15. It will be understood that the latex flows from the abrupt edge 39 but accumulates in the junction 40 of the panel 38 with the body portion 34 so that a reinforcement 42 at the margin of the opening 41 is provided. The portion of the layer on the lower end of the neck 36 is stripped or torn away as far as the abrupt edge 37 where the layer has accumulated by gravity as indicated at 43 (Fig. 16A). The part of the layer deposited on the upper neck 35 can be rolled upon itself to provide a bead roll 44 as indicated at Figs. 15 and 16. After the deposited shield has been properly dried on the form, it can be removed therefrom by stretching the lower end of the shield as shown in Fig. 15 until the lower portion on the form and the neck 36 can be drawn through the lateral opening 41 of the shield. Thereafter, the upper portion of the shield can be removed from the form by continuing to withdraw it through the center opening in the shield.

The invention is also applicable to the making of rubber pants on a form shown in Figs. 19, 20 and 21. This form has the general shape of the pants to be deposited thereon and includes a body portion 45 and leg portions 46 and 47. This form is adapted to be dipped vertically, being suspended by a support 50 projecting from the left end of the form as shown in Fig. 19. This left end comprises a panel 51 of smaller contour than the body portion 45 of the form. This panel has an abrupt edge 52 and extends abruptly from its junction 53 with the body of the form. It will be noted in Fig. 19 that the body portion merges by a sweeping curve to this junction. The free end of the leg portion 46 of the form likewise terminates in a raised panel 54 having an abrupt edge 55, said panel rising abruptly from its junction 56 with the leg portion. This leg portion also merges with the junction 56 by a sweeping curve illustrated at 57. Similarly the leg portion 47 merges by a sweeping curve 58 with the junction 59 between the leg portion and a panel 60 which rises abruptly from this junction 59. This panel also is provided with an abrupt edge 61.

In the making of pants on this form, the form is dipped in a convenient position by the support 50, one or more times into a latex bath wherein the form is completely submerged. Between each of the dippings, the layer of latex deposited on the form is permitted to dry in accordance with the usual practice. During the several dips the latex will tend to accumulate by surface tension in the junctions 53, 56 and 59 of the form, while it will tend to flow away from the abrupt edges 52, 55 and 61 to define lines of weakness in the deposited layer. When a layer of the desired thickness has been deposited on the form, this layer is permitted to dry and cure until it can be properly manipulated, then the portions of the layer over the panels 51, 54 and 60 can be parted from the remainder of the layer due to the mentioned lines of weakness defined therein during the dipping operations. However, the accumulations of latex at the junctions 53, 56 and 59 will provide reinforcements for the margins of the layer at the openings provided by the removal of the portion of the layer over the mentioned panels. When the rest of the deposited layer on the form has been properly dried and cured it can be stripped from the form by moving it toward the right as shown in Fig. 19. In this figure there is indicated a fragment of the rubber pants made in the manner just described wherein it will be noted that the main portion 62 is relatively thin, whereas, a thick reinforcing edge 63 is provided for the opening in the body portion and a reinforcement such as 64 is provided at the opening in each leg.

The invention can also be used in the making of rubber bathing caps. In the making of such caps, a form 65 illustrated in Figs. 22, 23 and 24 is employed. This form has the general shape of the bathing cap to be deposited thereon and is provided with depressed side surfaces 66 and 67 as best indicated at Fig. 24. This form during dipping is suspended by a support 68 projecting from the right end of the form as shown in Fig. 22. The right end of the form is provided with a panel 69 rising abruptly from its junction 70 with the main portion of the form. The edge 71 of the panel is abrupt to define a line of weakness in the deposited layer in the manner already mentioned. The main portion of the form merges toward junction 70 by a sweeping curved surface 72 so that the deposited layer on the form will not flow away from this surface.

In the making of a rubber bathing cap on this form, the form is dipped one or more times into a latex bath until it is completely submerged each time, with an interval for drying between each dip. When the deposited layer is of the desired thickness, the layer is permitted to dry and cure until it can be properly manipulated, then the portion of the layer covering the panel 69 is parted from the remainder of the layer as far as the line of weakness defined by the abrupt edge 71. It will be understood that in the course of the dipping operations, the latex will accumulate in the junction 70 until it fills the recess between the curved surface 72 and the elevated portion of the panel as indicated at 73 (Fig. 22). After the remaining portion of the cap has been dried and cured to the desired degree, it is removed from the form by stripping it toward the left of the form as illustrated in Fig. 22. The remaining operations of preparing the caps for sale need not be described, for they will follow the usual practice. It should be mentioned that the various forms disclosed are made of the usual materials employed for this purpose, namely glass or aluminum.

It will be understood by skilled artisans that the aqueous dispersion of rubber or latex may be vulcanized in any suitable way either before or after depositing the same on a form to produce the article.

While several embodiments of the invention have been disclosed, it will be understood that this invention is capable of still further modifications and that this disclosure is intended to cover any variations, uses or adaptations of the invention falling within the scope of the appended claims.

What I claim is:

1. The method of making rubber articles having at least one reinforced edge which comprises utilizing a form having a reinforcement-generating recess, said recess being defined by the junction of two surfaces of the form converging toward each other, one of said surfaces being an article-generating surface of the form and being devoid of any abrupt edge in the region of said junction, dipping said form into an aqueous dispersion of rubber to apply a coating of the rubber dispersion thereon, holding the form during the setting of the rubber thereon with said reinforcement-generating recess at such position that a region of rubber dispersion of greater thickness than that of the adjacent coating is retained within the recess mainly by surface tension, drying said coating, and removing the coating from the form.

2. The method of making rubber articles having at least one reinforced edge which comprises utilizing a form having a reinforcement-generating recess, said recess being defined by the junction of two surfaces of the form converging toward each other, one of said surfaces being an article-generating surface of the form and being devoid of any abrupt edge in the region of said junction and the other of said surfaces being a surface for defining an edge of the finished article, dipping said form into an aqueous dispersion of rubber to apply a coating of the rubber dispersion thereon, holding the form during the setting of the rubber thereon with said reinforcement generating recess at such position that a region of rubber dispersion of greater thickness than that of the adjacent coating is retained within the recess mainly by surface tension, drying said coating, and removing the coating from the form.

3. The method of making rubber articles having at least one reinforced edge which comprises utilizing a form having a reinforcement-generating recess, said recess being defined by the junction of two surfaces of the form converging toward each other, one of said surfaces being an article-generating surface of the form, dipping said form into an aqueous dispersion of rubber to apply a coating of the dispersion thereon, withdrawing the form from the aqueous dispersion with said reinforcement-generating portion in such direction that a region of rubber dispersion of greater thickness than that of the adjacent coating is held within the recess mainly by surface tension, drying said coating, and removing the coating from the form.

4. The method of making rubber articles having at least one reinforced edge which comprises utilizing a form having a reinforcement-generating portion, said portion being defined by the junction of two surfaces of the form converging toward each other, one of said surfaces being an article-generating surface of the form and being devoid of any abrupt edge in the region of said junction, the other of said surfaces terminating in an abrupt edge, dipping said form into an aqueous dispersion of rubber to apply a coating of the rubber dispersion thereon with a line of weakness in said coating at said abrupt edge, holding the form during the setting of the rubber thereon with said reinforcement-generating portion at such position that a region of rubber dispersion of greater thickness than that of the adjacent coating is retained within the junction mainly by surface tension, drying said coating, removing the coating from the form, and tearing said coating at said line of weakness subsequent to the drying of said coating.

5. The method of making rubber articles having at least one reinforced edge which comprises utilizing a form having a reinforcement-generating portion, said portion being defined by the junction of two surfaces of the form converging toward each other, one of said surfaces being an article-generating surface of the form and being devoid of any abrupt edge in the region of said junction, the other of said surfaces terminating in an abrupt edge, dipping said form into an aqueous dispersion of rubber to apply a coating of the dispersion thereon with a line of weakness in said coating at said abrupt edge, withdrawing the form from the rubber dispersion with said reinforcement-generating portion in such direction that a region of rubber dispersion of greater thickness than that of the adjacent coating is retained within the junction mainly by surface tension, drying said coating, removing the coating from the form, and tearing said coating at said line of weakness subsequent to the drying of said coating.

6. The method of making rubber articles having at least one reinforced edge which comprises utilizing a form having a reinforcement-generating recess, said recess being defined by the junction of two surfaces of the form converging toward each other, one of said surfaces being an article-generating surface of the form and being devoid of any abrupt edge in the region of said junction, dipping said form into an aqueous dispersion of rubber to apply a coating of the rubber dispersion thereon, holding the form in such position that the force of gravity tends to cause the flow of some of said dispersion away from said junction but an area of said rubber dispersion of greater thickness than that of the adjacent coating is retained in said recess mainly by surface tension, drying the said coating, and removing the coating from the form.

7. The method of making rubber articles having at least one reinforced edge which comprises utilizing a form having a reinforcement-generating recess, said recess being defined by the junction of two surfaces of the form converging toward each other, one of said surfaces being an article generating surface of the form and being devoid of any abrupt edge adjacent said junction, dipping said form into an aqueous dispersion of rubber to apply a coating of the rubber dispersion thereon, withdrawing the form from the aqueous dispersion with said reinforcement generating recess in such direction that the force of gravity tends to cause the flow of some of said dispersion away from said junction but an amount of said rubber dispersion of greater thickness than that of the adjacent coating is retained in the recess mainly by surface tension, drying said coating, and removing the coating from the form.

8. The method of making rubber articles having at least one reinforced edge which comprises utilizing a form having a reinforcement-generating portion, said portion being defined by the junction of two surfaces of the form converging toward each other, one of said surfaces being an article-generating surface of the form and being devoid of any abrupt edge in the region of said junction, the other of said surfaces terminating in an abrupt adge, dipping said form into an aqueous dispersion of rubber to apply a coating of the rubber dispersion thereon with a line of weakness at said abrupt edge, holding the form in such position that the force of gravity tends to cause the flow of some of said dispersion away from said junction but an amount of the rubber dispersion of greater thickness than that of the adjacent coating is retained in the junction mainly by surface tension, drying the said coating, removing the coating from the form, and tearing said coating at said line of weakness subsequent to the drying thereof.

9. The method of making a deposited rubber article having a reinforced marginal edge which comprises utilizing a form having a raised abrupt edge on its surface at any portion thereon to define an edge of the article, repeatedly dipping said form in the same direction into an aqueous dispersion of rubber to deposit a coating thereon, supporting said form during the draining operations so that a substantial portion of said abrupt edge is maintained at a higher elevation than the lowermost portion of the resulting finished article thereon whereby the force of gravity tends to cause said dispersion to flow away from said abrupt edge, drying said coating, and tearing the coating at said abrupt edge.

10. The method of making a deposited rubber article having a reinforced marginal edge which comprises utilizing a form having a raised abrupt edge on its surface at any portion thereon to define an edge of the article, repeatedly dipping said form into, and withdrawing the same from an aqueous dispersion of rubber, the withdrawals of said form from said aqueous dispersion being in such direction that a substantial portion of said abrupt edge is maintained at a higher elevation than the lowermost portion of the resulting finished article thereon whereby the force of gravity tends to cause said dispersion to flow away from said abrupt edge, drying said coating and parting the coating at said abrupt edge.

11. The method of making a deposited article of rubber having a reinforced margin which comprises utilizing a form with an abrupt edge and with a recess adjacent thereto defined by converging walls, one of said walls being an article-generating surface of the form, applying an aqueous dispersion of rubber on said form to deposit a coating of the same thereon with a line of weakness therein at said abrupt edge and with a ridge on said coating of the aqueous dispersion of rubber retained mainly by surface tension in said recess, drying the coating and tearing the coating at said line of weakness.

12. The method of making a deposited article of rubber having a reinforced edge which comprises utilizing a form of the general shape of the desired article and having a raised panel with an abrupt edge adjacent a main surface of the body of the form, said panel with said main surface defining a recess with converging walls at that portion of the form where it is desired to provide a reinforcement in said article, applying an aqueous dispersion of rubber to said form to deposit a coating of the same thereon with a line of weakness in said coating at said abrupt edge and to accumulate an increased thickness of said coating in said recess mainly by surface tension, and tearing said coating at said line of weakness.

13. The method of making a deposited article of rubber which comprises utilizing a form having a body portion and an overhanging portion with an abrupt edge adjacent said body portion, said portions defining a recess with converging walls, applying an aqueous dispersion of rubber on said form to deposit a layer of the same thereon with a line of weakness at said abrupt edge while accumulating mainly by surface tension at the underside of said overhanging portion an increased thickness of said layer in a portion thereof forming a part of the finished article, and parting the deposited layer at the line of weakness therein.

14. The method of making a deposited article of rubber having an opening therein provided with a reinforced edge which comprises utilizing a form having a body portion and an overhanging portion with a continuous abrupt edge adjacent said body portion, said portions defining a recess with converging walls, applying an aqueous dispersion of rubber on said form to deposit a layer of the same thereon with a line of weakness at said continuous abrupt edge while accumulating mainly by surface tension at the underside of said overhanging portion an increased thickness of said layer in a portion of the same forming a part of the finished article, and tearing the deposited layer at the line of weakness therein.

15. The method of making a deposited rubber finger cot which comprises utilizing a form having a generally cylindrical portion with one rounded end, and an overhanging portion projecting from, and having an abrupt edge adjacent to the other end of said cylindrical portion, said portions defining a recess with converging walls, applying an aqueous dispersion of rubber on said form to deposit a layer of the same thereon with a line of weakness at said abrupt edge while accumulating mainly by surface tension at the underside of said overhanging portion an increased thickness of said layer in a portion thereof forming a part of the finished cot, and parting the deposited layer at the line of weakness therein.

ABRAHAM N. SPÁNEL.